Dec. 3, 1957 J. F. KAIN 2,815,493
CURRENT TRANSFORMER
Filed June 28, 1954

Inventor:
John F. Kain
by, Richard E. Hosley
His Attorney

United States Patent Office 2,815,493
Patented Dec. 3, 1957

2,815,493

CURRENT TRANSFORMER

John F. Kain, Marblehead, Mass., assignor to General Electric Company, a corporation of New York Application June 28, 1954, Serial No. 439,827

2 Claims. (Cl. 336—174)

This invention relates generally to electromagnetic induction devices and more particularly to such devices in the form of current transformers.

One common form of current transformer is the so-called "bar" type werein the primary winding of the transformer is in the form of an electrically conducting bar and the secondary winding is in the form of a toroidally shaped winding arranged around the bar in inductive relationship with respect thereto. Normally such transformers have a suporting base member for affixation to appropriate supporting structure in the area selected for installation of the transformer, and one form of such transformers had their primary bars rigidly and immovably arranged in the transformer. Under such circumstances the terminals on the primary bars would have a fixed position with respect to the transformer base member and such an arrangement would, in many instances, unnecessarily complicate the installation and servicing thereof, particularly in those cases where the transformer must be connected into existing equipment. For example, the supporting structure and the arrangement of the electrical system bus bars or conductors may be such as to prohibit proper connection without resorting to special supporting or terminal arrangements or both.

It is, accordingly, an object of the invention to provide an improved transformer having primary terminals movably mounted thereon whereby greater flexibility and adjustability in installation and servicing of such devices is achieved.

The invention comprises the arrangement of a transformer wherein the primary bar is rotatably mounted with respect to the base member as well as being axially slidable with respect thereto, the bar being assembled in the transformer by means of a simple and effective friction fit to permit ready adjustment of the position of the bar during installation and service of the device.

Figure 1:
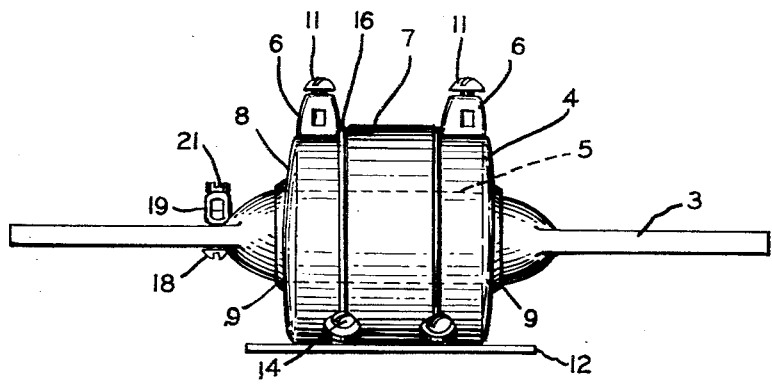
Figure 2:
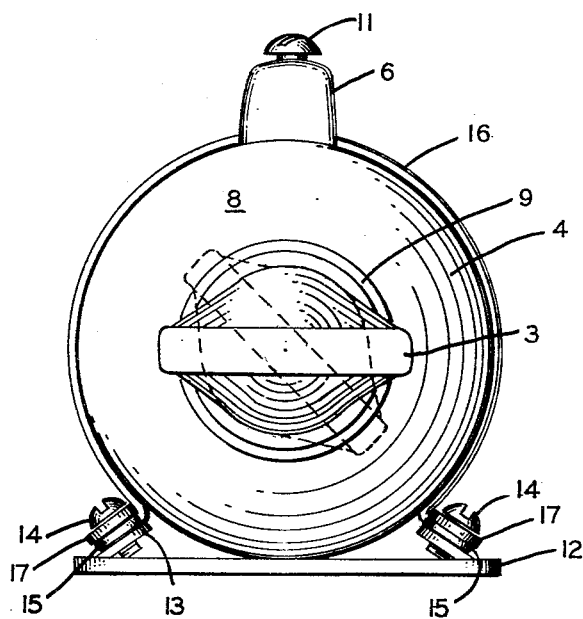

The invention will be best understood upon reference to the detailed description set forth below when taken in conjunction with the drawing annexed thereto in which Figure 1 is a side elevation view of the improved transformer and Figure 2 is an enlarged end view of the transformer shown in Figure 1, the dotted lines thereon showing an alternate position for the adjustably mounted primary bar.

Referring first to Figure 1, there is shown an improved bar-type current transformer having its primary winding in the form of an electrically conducting bar 3 around which is arranged a secondary winding (not shown) in inductive relationship with respect thereto, the secondary winding being enclosed within an outer casing 4. This outer casing has a substantially circular aperture extending axially therethrough to define the bore 5, through which the primary bar 3 extends.

From the standpoint of the electrical operation and characteristics of the transformer, it is in many respects similar to the current transformer shown in U. S. Patent No. 2,436,636—D'Entremont, issued February 24, 1948 and assigned to applicant's assignee. The secondary winding of the transformer shown herein is similar to the windings in the aforesaid D'Entremont patent in that it is toroidal in shape and is wrapped around a core member in the form of a ring whose cross section also defines a toridal shaped member. Neither one of these features is a part of the invention to be described and claimed herein, and details thereof have been omitted herein for the sake of brevity and clarity. Suffice to say, though, the secondary winding is wrapped around a suitable core, and the transformer structure is completed in the manner to be described below.

The casing 4 is of the type that can be molded around the secondary winding to completely encase this winding therein and thereby provide a substantially self-supporting structure. The material selected for the casing may be a butyl rubber compound and serves as insulating means for the transformer as well as supoprting means. The casing is of a type illustrated and described in U. S. Patent No. 2,618,689—Cook, issued November 18, 1952, and also assigned to applicant's assignee, and inasmuch as this type of transformer casing is adequately and completely discussed therein, further description is unnecessary, the casing material and method of molding being well understood in the art and hence being omitted for the sake of brevity.

It is to be noted that the casing is roughly cylindrical in form, having the vertically extending terminal portions 6 as an integral part thereof, and it also has the centrally located slightly raised ridge section 7 lying between the terminal portions 6. The ends of the casing are slightly convex outwardly, as indicated at 8, and each has the outward projecting annular flange portions 9 immediately surrounding the extremities of the bore 5. The terminal portions 6 carry the screws 11 as well as internal electrical parts so that external leads may be properly connected to the secondary winding enclosed by the casing 4. A base 12 in the form of a substantially flat, metallic sheet is provided so that the transformer may be properly supported when installed, and this base has a plurality of sections partially punched out and bent upwardly towards the transformer casing to form the tongues 13. These tongues are suitably threaded to cooperate with a plurality of screws 14, which in turn cooperate with the hooked ends 15 of the retaining wires 16. As illustrated, there are two such retaining wires, and they are slipped around the casing, being retained in place against the sides of the centrally located ridge 7 and lying between the channel formed by the sides of the ridge 7 and the inner sides of the base of the terminal portion 6. With both of the ends of the two retaining wires hooked around the screws 14 and with a suitable washer 17 properly in place, the transformer casing can be secured to the base 12 by tightening up all of the screws 14. The base may have suitably threaded apertures (not shown) so that it may be affixed to any apropriate supporting structure located in the area in which the transformer is to be installed.

The primary bars may have a plurality of apertures on either or both of the flat ends thereof and they may also include one or more of the terminals of the type shown in Figure 1 wherein a screw 18 threadably engages a suitable aperture running through the flat portion of the terminal bar 3 and also threadably engages a socket member 19 having thereon opposite to the screw 18 the screw 21. Such an arrangement permits the socket to be tightly affixed to the primary by means of the screws 18 and a wire or electrical lead may be connected to the socket by insertion into the open recess provided and clamped in place simply by tightening up the screw 21. Other terminal arrangements can be provided, the specific details of which forming no part of the present invention and being well understood are omitted for the sake of brevity.

In the particular transformer shown in the drawing, the primary bar is in the form of a hollow copper conducting tube having both of its ends swaged to form the flat terminal sections. However, it could be a solid bar or conducting lead as well as the tubular member shown.

When the casing 4 is molded around the secondary winding and other associated internal structure, the bore 5 is formed by molding the parts around a suitable mandrel. By having this mandrel properly dimensioned, the finished internal dimension of the bore 5 can be selected to have a diameter slightly less than the outer diameter of the primary bar 3 intended to be used therewith. With such an arrangement, the primary bar will have to be forced into its position within the transformer and will be held in place at all times by means of the friction fit provided by the resilient casing surrounding and pressing upon the bar throughout its length within the bore 5. However, the fit will not be so tight as to prevent rotation of the bar or prevent axial sliding of the bar within the bore for purposes of installation or service when the transformer is used in the field. Normally the parts will be arranged so that the flat terminal portions of the primary bar are substantially parallel to the flat base plate 12, but for any particular installation the bar can be rotated with respect to the plate 12 or moved longitudinally with respect thereto to simplify and facilitate installation where such positioning of the bar is necessary.

Ordinarily, a friction fit of the type described above will bring the copper primary bar into intimate contact with the rubber casing, and unless protective measures are taken, an objectionable sulphide coating will be formed on the surface of the primary bar through the action of the copper with any excess sulphur normally remaining at the surface of the rubber after completion of the vulcanization process. Any suitable lacquer can be applied to the bar prior to insertion within the casing to prevent the formation of the aforesaid objectionable sulphide on the surface thereof.

The transformer illustrated is primarily intended to be used as an instrument current transformer rated at 600 volts and either 200 or 400 amperes, either current rating having a continuous thermal rating of 200 percent, or 400 or 800 amperes, respectively. The use of the resilient insulating material for the outer casing surrounding the primary bar and pressing thereupon provides an excellent friction fit for the parts, permitting the bar to be readily adjusted as required, and the fit is such that the parts will be retained in any pre-selected position.

It will be understood that the invention herein is not limited to the specific embodiment illustrated and described and that the following claims are intended to cover all changes and modifications which do not depart from the true spirit and scope of the invention.

What I claim as new and desire to secure by Letters Patent of the United States is:

1. An instrument current transformer including a toroidally shaped secondary winding, an outer casing of resilient insulating material molded around said winding and having an axial aperture defining a bore therethrough, and an electrically conducting primary bar extending through said bore, said bar being slidably and rotatably mounted with respect to said winding, said resilient material forming the walls of said bore, the diameter of said bore being slightly less than the outer diameter of said bar whereby said bar is frictionally retained within said bore in any preselected position.

2. An instrument current transformer including a toroidally shaped secondary winding, an outer casing of rubber insulating material molded around said winding and having an axial aperture defining a bore therethrough, a base member affixed to said casing, and an electrically conducting primary bar extending through said bore, said bar being slidably and rotatably mounted with respect to said base member, said rubber material forming the walls of said bore, the diameter of said bore being slightly less than the outer diameter of said bar whereby said bar is frictionally retained within said bore in any preselected position.

References Cited in the file of this patent

UNITED STATES PATENTS

| | | |
|---|---|---|
| 687,141 | Everest | Nov. 19, 1901 |
| 1,766,048 | Trogner | June 24, 1930 |
| 2,382,199 | Brink | Aug. 14, 1945 |
| 2,436,636 | D'Entremont | Feb. 24, 1948 |
| 2,483,801 | Becwar | Oct. 4, 1949 |
| 2,618,689 | Cook | Nov. 18, 1952 |
| 2,669,700 | Rauch | Feb. 16, 1954 |
| 2,757,346 | Lahaye | July 31, 1956 |

FOREIGN PATENTS

| | | |
|---|---|---|
| 498,756 | Great Britain | Jan. 9, 1939 |